DELTA CLOCK AND INTERRUPT LOGIC

Filed April 22, 1969 2 Sheets-Sheet 1

Melvin J. DeBlauw,
INVENTOR

BY Robert C. Sims

Feb. 23, 1971 M. J. DE BLAUW 3,566,368

DELTA CLOCK AND INTERRUPT LOGIC

Filed April 22, 1969 2 Sheets-Sheet 2

Melvin J. DeBlauw,
*INVENTOR*

BY Robert C. Sims 3,566,368

DELTA CLOCK AND INTERRUPT LOGIC

Melvin J. De Blauw, West St. Paul, Minn., assignor, by mesne assignments, to the United States of America as represented by the Secretary of the Army Filed Apr. 22, 1969, Ser. No. 818,373
Int. Cl. G06f *1/04*
U.S. Cl. 340—172.5 3 Claims

ABSTRACT OF THE DISCLOSURE

A delta clock system is provided to indicate if a particular task has exceeded a predetermined time limit. However, the clock system contains additional restart time which will be used the first time the clock runs out. At this time a soft interrupt request is generated. The second time the clock runs out a hard interrupt request will occur, and if there is an error lockout signal present, a stop signal will be sent. If there is no lockout signal, the additional time is provided once again, and if the program does not reset the clock or the interrupt routine is not complete, a stop signal will be generated at the end of the second additional time.

BACKGROUND OF THE INVENTION

This invention is directed towards the field of data programing devices. In the past, the delta clock would only give one signal when its count reached zero—a stop signal. However, this is not proper as sometimes a program hangup will be eliminated if the task at hand were allowed to run a bit longer. Of course, some situations require a stop signal after a certain time period. Therefore, there is a need for the present invention of a delta clock which allows for additional time for the task to be run, but will generate a stop if an error lockout signal is present or if desired by the program.

SUMMARY OF THE INVENTION

The delta clock is a register which counts down in response to a 500 kHz. oscillator. The delta clock register monitors the programmed execution of a task and, if the task completion time exceeds predetermined limits, the contents of the register become zero. A zero detector and controller senses this zero and initiates requests for either of two interrupt actions: a Phase I interrupt or a Phase II interrupt. A Phase I interrupt allocates additional time, if it is masked, for the task to be performed before a Phase II interrupt occurs, at which time the execution of the program will be halted automatically if an error lockout exists.

To implement this detection scheme, two types of information are entered into the delta clock register: a 20-bit indication of time, entered into the extreme right-hand bit positions in what will be called Δ1, the starting value; and, to the left, a 12-bit number (Δ2) which is the restart value of the register. At the start of a task, the program must enter the two numbers into the delta clock. Every two microseconds the start portion of the delta clock register is decremented by a one-count under the control of a 500 kHz. oscillator.

If the start portion of the register decrements to zero, a Phase I interrupt is generated by the zero detector controller and a control flip-flop is set to indicate that this interrupt condition has occurred. A copy of the 12 bits in the restart portion of the register is entered in the start portion of the delta clock register. In turn these bits are decremented one-count every two microseconds. If the program reloads the delta clock, then the control flip-flop is reset. If the control flip-flop remains in the set state and the copied number in the start position of the register decrements to zero, again the 12-bit number in the restart portion of the register enters the start portion, at which time a Phase II interrupt occurs. If, at this time an error lockout exists, the processor transfers a report to the Status unit of the computer and halts the execution of the program. If there is no error lockout signal present, then the Phase II interrupt is recorded by a further flip-flop in the zero detector control. The start portion is once again decremented to zero at two microseconds intervals. When this zero is detected, the clock stops and a "stop" signal is sent out from the zero detector which halts further operation of the computer and indicates a hangup the task being performed. Manual intervention is required to start operation again. At any time the program reloads the delta clock register, the zero detector control and its flip-flops are cleared and the count down starts at the new Δ1 value.

DESCRIPTION OF THE PREFERRED EMBODIMENT

Figures 1, 2:
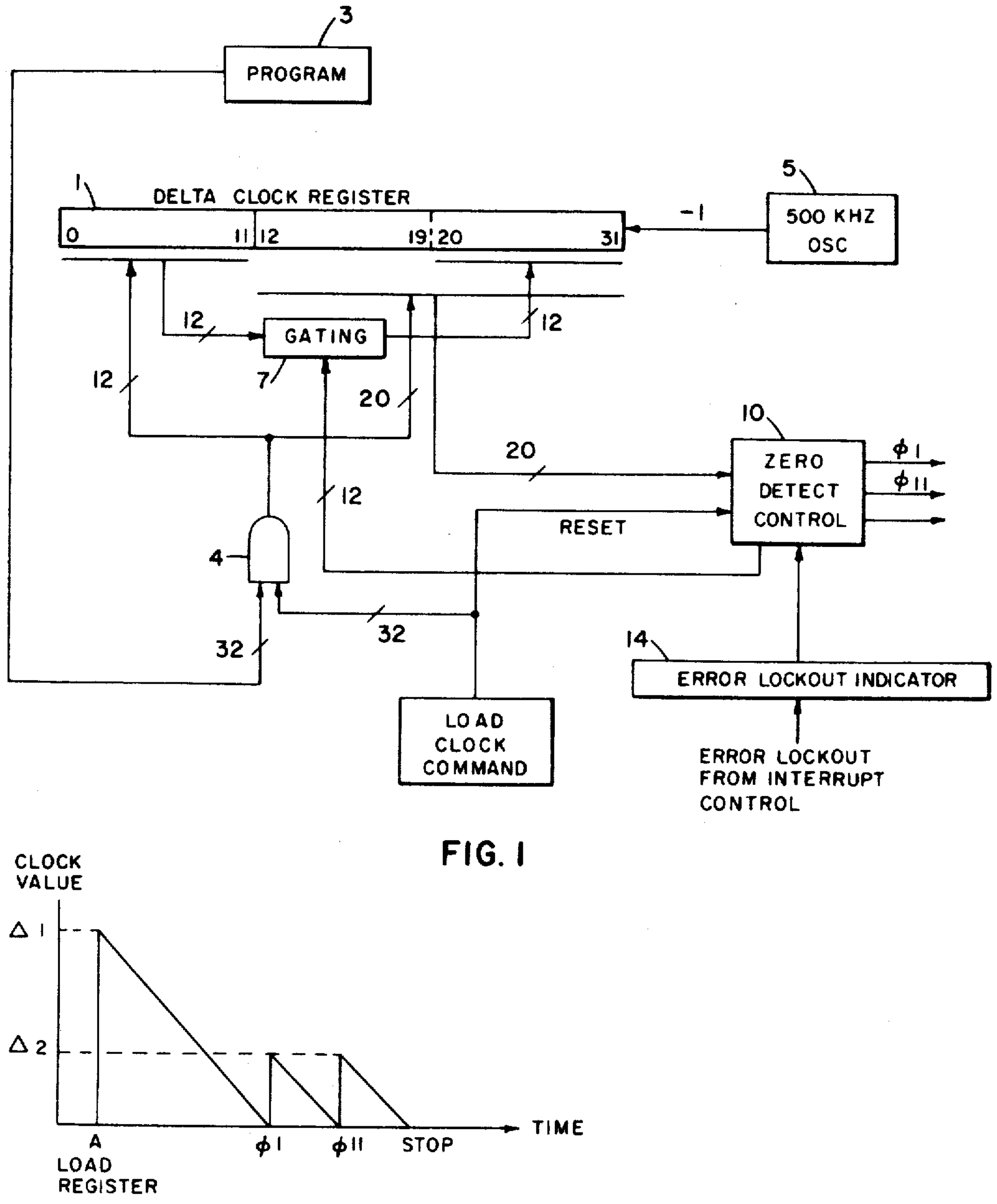
FIG. 1 is a block diagram illustrating a preferred form of the present invention.
FIG. 2 is a graph illustrating the time-count characteristics of the present invention.
Figure 3:
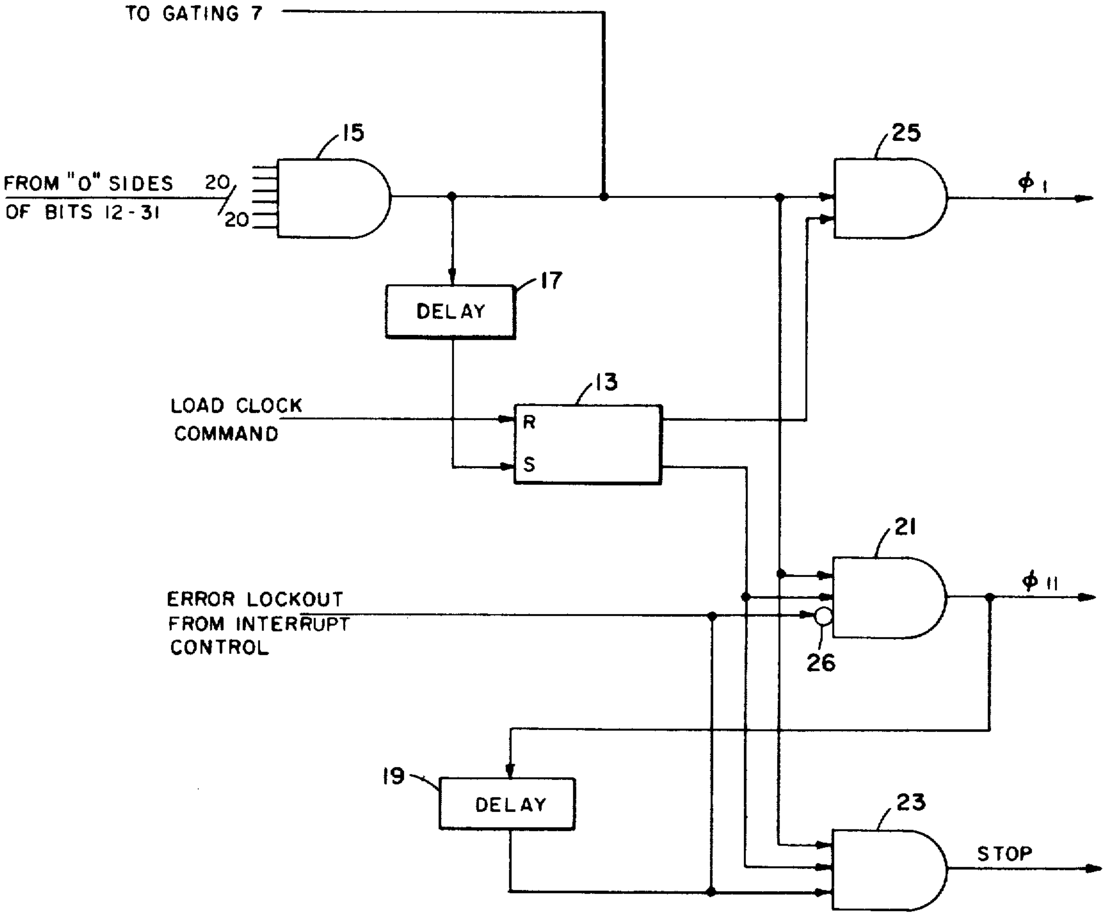
FIG. 3 is a schematic diagram illustrating a possible form of the zero detect control.

FIG. 1 shows the delta clock register 1 connected to the program section 3 of the data processor. The delta clock is a 32 bit register which is decremented at 2 μsec. intervals by a 500 kHz. oscillator 5. The oscillator and register can be any of the well-known count down devices in the art. Oscillator 5 only decrements the number placed in bit position 12–31. The delta clock register 1 is initially loaded by the program section 3 of the data processor under control of appropriate gating devices 4. Two types of information are entered into the clock register by the program. A starting value Δ1 is entered into the extreme right-hand bit position 12–31. A restarting value Δ2 is entered into the left end bit positions 0–11. The restarting portion of the delta clock register is connected to the 20–31 bit position by way of gating means 7. Gating means 7 could be AND gates. A number and the symbol "/" in the drawing indicates that the lines and the gates are repeated the amount of times of the number, and are connected to different ones of the bits. Therefore, in FIG. 1 there are twelve gating means 7 and thirty-two AND gates 4, and the appropriate number of connections therewith. A zero detect control 10 (zero detector and controller) is connected to the bits 12–31 so as to detect when the count in this section of the register reaches zero. Any of the well-known zero detectors could be used to perform this function, such as an AND gate having as its inputs all the "0" outputs of bits 12–31 of Register 1. A further example of a possible zero detect control is shown in FIG. 3 to be described later.

FIG. 2 illustrates the timing of the operation of FIG. 1. The slopes are shown as straight lines instead of steps. At any predetermined time "A" a command is generated by the program section 3 of the data processor to load the delta clock register. This command enables gates 4 and the Δ1 and Δ2 information is loaded into register 1 by program 3. Also, the zero detect control is reset by the load clock command. Oscillator 5 causes bits 12–31 to count down. While this count is taking place, a task is being performed somewhere in the data processor. The amount of time this task should take (or the amount of time the task should not take more than) is Δ1 as determined by the program. If the task takes less than this amount of time, then another load clock command is generated and the delta clock register 1 is reloaded. However, if the task is not completed by this time, then it is possible that there is a hangup. Therefore the zero detect control 10 is provided to sense when the contents of bits 12–31 of the register reach zero. When this happens the first time, zero detect control generates a Phase I output on one of its three output terminals and sets a flip-flop (see FIG. 3) to indicate that this Phase I output has been generated. The gating 7 is enabled and the $\Delta 2$ information non-destructively copied into bits 20–31 of the delta clock register. This number is now decremented at 2 $\mu$sec. intervals by oscillator 5. When the contents of start portion of the register is again reduced to zero (assuming that the register was not reloaded by the program) this zero is detected by the zero detect control 10 which generates a Phase II output. The value $\Delta 2$ is again copied into the start portion of the delta clock register. At this time, if the error lockout indicator 14 indicates there is an "error lockout" signal from the interrupt logic, the clock will stop, and a "stop" signal will be sent from the zero detect control. If there is no "error lockout" signal present, the contents of bits 12–31 will once again be decremented at 2 $\mu$sec. intervals. Indicator 14 could be an OR gate or a straight connection. When the contents of bits 12–31 is again reduced to zero (assuming that the register was not reloaded by the program), this zero is detected, the clock stops and the "stop" signal and alarm is generated. At anytime the program reloads the delta clock register, the zero detect control 10 is cleared and reset and the count down will start at the new $\Delta 1$ value.

Because of the arrangement of the present invention, the delta register affords considerable programming flexibility in controlling critical and non-critical tasks. For example, in controlling a critical realtime task, all zeros can be entered in the restart portion of the register, thereby minimizing the elapsed time (2 $\mu$seconds) between Phase I and Phase II interrupts. On certain non-critical tasks having short duration, the allocation of time between Phase I and Phase II interrupts can be equal to or exceed the time required to complete the task. This assumes that the time required to complete the task is numerically equal to, or less than, the 12 bit number in the restart portion of the register; i.e., the restart portion of the register contains the same number or a larger number than the start portion of the register.

The present invention could be used in many of the known data processors which have two levels of interrupt. For example, the invention could be utilized in the data processor of Arndt et al. disclosed in U.S. Pat. 3,260,997, patented on July 12, 1966, or in the patent to Tucker, Jr., Pat. No. 3,219,976 on Nov. 23, 1965. To further show how the Phase I and II signals are utilized, a description of a possible interrupt logic is given. There are two basic categories of interrupt signals. They are error interrupts and non-error interrupts. Error interrupts are those interrupts caused by undesired conditions such program errors, task hangups, or an equipment malfunction. These interrupts are further classified as either critical or non-critical (or recoverable and non-recoverable). All non-error interrupts and all non-critical error interrupts can be masked out by program control. That is, the program can cause these interrupts to be ignored by the interrupt logic. All critical errors cannot be masked by the program. A critical error interrupt is defined as any condition, the detection of which causes the processor to interrupt operation immediately or to discontinue operations because continued operation is beyond the capability of the hardware. The non-recoverable (critical) errors causes control of the processor to be transferred to an error interrupt routine. The processor is master cleared before control is transferred to this error interrupt routine. In the case of a recoverable error, the processor is not cleared before transferring control. In the case of recoverable errors, the processor is not hung up, and at the end of the error interrupt routine, control of the processor can be transferred back to the main program at the point which it was interrupted. The Phase I output signal from the zero detect control 10 is categorized as a non-error interrupt request, and the Phase II output is categorized as a critical, non-recoverable error interrupt request. If the Phase I signal occurs and this interrupt request is not masked by the program and there is no lockout set (error or non-error), this interrupt request will be recognized by the interrupt logic of the data processor transferring control to a non-error interrupt routine. The non-error lockout will then be set. If the Phase I signal is masked out or if there is a lockout set, nothing will happen as a result of the Phase I signal. If the delta clock register is not reloaded by the program, the Phase II signal will occur. If the error lockout is not set, the Phase II interrupt request will be recognized by the interrupt logic, the error lockout will be set, the processor will be master cleared, and control of the processor will be transferred to the error interrupt routine. If the error lockout was set when the Phase II signal occurred, the delta clock would have stopped, and the processor would have been placed off the line. Manual action is required after a "stop" has been effected. This "stop" also occurs when the clock counts down for the third time.

FIG. 3 shows one possible example of a zero detector and controller (zero detect control 10). An AND gate 15 having 20 inputs connected to the "0" sides of the bits 12–31 of the detla clock register 1 makes up the zero detector portion of the device. Whenever gate 15 senses a zero condition of bits 12–31 of the clock, then it has an output which is sent to gating 7 to cause the number in the restart portion to be copied into the bit position 20–31 of the delta clock register. The output from gate 15 is also sent to set-reset flip-flop 13 by way of a delay device 17. Delay device 17 is a 3 $\mu$sec. delay so as to allow the register to fill up again and, therefore, the output of gate 15 to become zero again. A similar delay device 19 is provided between the Phase II output of AND gate 21 and one of the inputs of AND gate 23. When the count first becomes zero, flip-flop 13 will be in its reset condition; therefore enabling AND gate 25 with respect to an output from gate 15 and disenabling AND gates 21 and 23. Therefore, after the first zero AND gate produces the Phase I output which is sent to the non-error interrupt network by way of the masking means, both not shown. When the register again goes to the zero count, another output is generated from gate 15. This time flip-flop 13 is in its set condition (provided the program has not reloaded the clock and generated a load clock command); therefore AND gate 21 will generate the Phase II signal; provided there is no "error lockout" signal. The "error lock" signal is inverted by invertor 26 before entering an input of AND gate 21. If there is an "error lockout" signal, then a STOP signal is generated by AND gate 23. In any event, a STOP signal will occur upon the third count down as AND gate 23 is enabled by the signal from the phase II output by way of delay means 19. If at any time the delta clock is reloaded and a load clock command is generated, then flip-flop 13 is reset and the control part of the zero detector and control will begin its cycle again.

While the invention has been described with reference to a preferred embodiment thereof, it will be apparent that various modifications and other embodiments thereof will occur to those skilled in the art within the scope of the invention. It will be apparent that the invention has utility by itself and in combinations other than a data processor, such as an event indicator or a conditional relay system. Accordingly, it is desired that the scope of the invention be limited only by the appended claims.

I claim:

1. A system comprising a register; said register being divided into first and second portions with each of said portions disposed to be set in such a condition as to represent individual numbers corresponding to said portions; timing means connected to said first portion of said register to cause the number represented by said first portion to be decremented; first means connected to said first portion of said register to sense when the number of said portion becomes zero; said first means having first, second, and third output terminals; said first means disposed to have a single output on its first output terminal only when it first senses a zero count of said portion of said register; second means connected between the first portion and second portion of said register so that upon activation it will copy the number of the second portion into the first portion of the register; said first means being connected to said second means so as to activate it upon the sensing of a zero in said first portion of said register; and said first means having outputs on its said second and third output terminals upon sensing further zero counts in the first portion of said register.

2. A system as set forth in claim 1, wherein said register is a delta clock register adapted to be connected as a part of a data processor; said numbers of the portions of the register being inserted therein by a part of the data processor; and each time said numbers are so inserted, said first means being reset by a signal from a connection from the data processor so that it will have an output on its first terminal upon the next occurrence of a zero on the first portion of said register.

3. A system as set forth in claim 2, wherein said data processor has a lockout signal indicator connected to said first means so that it will have a single output on its second output terminal upon the second occurrence of a zero in the first portion of said register—without the occurrence of a reset of the first means—if the indicator indicates there is no error lockout signal present and will have a single output on its third output terminal if the indicator indicates there is an error lockout signal present; an output on said first output terminal representing a request for a non-error interrupt; an output on said second output terminal representing a request for a critical error interrupt; an output on said third output terminal representing a request for a stop.

References Cited

UNITED STATES PATENTS

| | | | |
|---|---|---|---|
| 3,308,442 | 3/1967 | Couleur et al. | 340—172.5 |
| 3,334,333 | 8/1967 | Gunderson et al. | 340—172.5 |
| 3,351,910 | 11/1967 | Miller et al. | 340—172.5 |
| 3,363,234 | 1/1968 | Erickson et al. | 340—172.5 |

PAUL J. HENON, Primary Examiner

P. R. WOODS, Assistant Examiner